United States Patent
Prieto

Patent Number: 5,974,181
Date of Patent: Oct. 26, 1999

[54] DATA COMPRESSION SYSTEM, METHOD, AND APPARATUS

[75] Inventor: Yolanda Prieto, Miami, Fla.

[73] Assignee: Motorola, Inc., Schaumburg, Ill.

[21] Appl. No.: 08/822,404

[22] Filed: Mar. 20, 1997

[51] Int. Cl.$^6$ .............................. G06K 9/36; G06K 9/46; G06K 9/38

[52] U.S. Cl. .......................... 382/232; 382/235; 382/248; 382/251; 382/253

[58] Field of Search ...................................... 382/232, 233, 382/239, 235, 248, 254, 260, 276, 240, 275, 251, 261; 348/395, 398, 403, 408, 417, 418; 358/426, 261.3, 432, 433

[56] References Cited

PUBLICATIONS

J. Kovačevič, "Subband Coding Systems Incorporating Quantizer Models", IEEE Transactions on Image Processing, vol. 4, No. 5, pp. 543–553, May 1995.

A. Averbuch et al., "Image Compression Using Wavelet Transform and Multiresolution Decomposition", IEEE Transactions on Image Processing, vol. 5, No. 1, pp. 4–15, Jan. 1996.

Sayood, Khalid, "Introduction to Data Compression," University of Nebraska at Lincoln, Morgan Kaufmann Publishers, Inc., San Francisco, California 1996.

Caglar, Hakan, "A Generalized, Parametric PR–QMF/ Wavelet Transform Design Approach for Multiresolution Signal Decomposition," UMI Dissertation Services, 1995. IEEE Transactions on Image Processing, Jul. 1996.

Strintzis, M.G., "Optimal Selection of Multi–Dimensional Biorthogonal Wavelet Bases," IEEE 1994.

Chen, W., Smith, C.H., Fralick, S.C., "A Fast Computational Algorithm for the Discrete Cosine Transform," IEEE 1977.

Van Dyck, R.E., Moayeri N., Marshall T.G., and Chin M., "Video Coding using Entropy–Constrained Trellis Coded Quantization," Proceedings of the SPIE vol. 2298, pp. 119–130, 1995.

Gharvai, H., "Sub–Band Coding of Monochrome and Color Images," Transactions on Circuits and Systems, IEEE 1988.

Ahmed N., Natarajan T., and Rao, K.R., "Discrete Cosine Transform," The Institute of Electrical and Electronics Engineers, Inc., IEEE Comput. Trans. 1974.

Huh Y., Hwang J.J., and Rao, K.R., "Block Wavelet Transfer Coding of Images using Classified Vector Quantization," IEEE Transactions on Circuits and System, vol. 5, No. 1, Feb. 1995.

Nasrabadi, N.M. and King R.A., "Image Coding using Vector Quantization: A Review,", IEEE Transactions on Communications, vol. 36, No. 8, Aug. 1988.

Versvik I. and Guren, H.C. "Subband Coding with Vector Quantization," IEEE 1986.

"Scalar Quantization" Chapter 8, pp. 289–354.

Soman A.K. and Vaidyanathan P.P. "Paraunitary Filter Banks and Wavelet Packets," Department of Electrical Engineering, Cal. Tech., IEEE 1992.

(List continued on next page.)

*Primary Examiner*—Blian Tadayon
*Assistant Examiner*—Tomitry A. Novik
*Attorney, Agent, or Firm*—Val Jean F. Hillman; Barbara R. Doutre

[57] ABSTRACT

A data compression system 200, method, and apparatus 214 employs an encoder 210 optimized to decorrelate and make independent from the original signal 202, the quantization noise produced during signal compression. The proposed system 200, method, and apparatus 214 supports high degrees of signal compression, which in turn leads to lower computational complexity and improved performance. Because the quantization noise produced during signal compression is made independent from and non-orthogonal (i.e., uncorrelated) to the original signal 202, enhanced filtering is achievable, which in turn leads to improvements in the signal-to-noise ratio (SNR) of the decoder 220.

39 Claims, 12 Drawing Sheets

PUBLICATIONS

Fowler, Jr. J., Adkins, K.C., Bibyk S.B., and Ahalt S.C. "Real–Time Video Compression using Differential Vector Quantization," *IEEE* 1995.

Chan P. and Lim J.S. "One–Dimensional Processing for Adaptive Iage Restoration," *IEEE* 1985.

Abramatic JF and Silverman L.M. "Nonlinear Restoration of Noisy Images," *IEEE* 1982.

Andrew J.P., Ogunbona P.O. and Paoloni F.J., University of Wollongong, NSW, Australia, "Coding Gain and Spatial Localisation Properties of Discrete Wavelet Transform Filters for Image Coding," *IEEE* 1995.

Onno P. and Guillemot C. "Tradeoffs in the Design of Wavelet Filters for Image Compression," Process of the SPIE International Society for Optical Engineers, vol. 2094, Pt.. 3, pp. 1536–1547, 1993.

Makhoul J., Roucos S., and Gish H. "Vector Quantization in Speech Coding," BBN Labs, Inc., Cambridge, MA, *IEEE* 1985.

"Wavelets: An Elementary Treatment of Theory and Applications," Series in Approximations and Decompositions—vol. 1, edited by Koornwinder T.H., World Scientific Publishing Co. Pte. Ltd., London, England, 1993.

Anderson G.L. and Netravali A.N., "Image Restoration Based on a Subjective Criterion," Bell Labs, New Jersey, IEEE Transactions on Systems, Man, and Cybernetics, vol. SMC–6, No. 12, Dec. 1976.

Sajadieh M. and Venetsanopoulos A.N., "Wavelet Vector Quantization of Images," Department of Electrical Engineering, University of Toronto, Toronto, Ont., Canada, IEEE 1992.

Westerink P.H. "Subband Coding of Images," Oct. 1998.

Averbuch A., Lazar D., and Israeli M., "Image Compression using Wavelet Transfer and Multiresolution Decomposition," *IEEE* 1996.

Kovacevic J., "Subband Coding Systems Incorporating Quantizer Models," Signal Processing Research Dept., AT&T Bell Labs., Murray Hill, New Jersey, *IEEE* 1995.

400

500

1200

1300

DATA COMPRESSION SYSTEM, METHOD, AND APPARATUS

CROSS REFERENCE TO RELATED APPLICATIONS

This application is related to U.S. application Docket No. CM02286J, by Yolanda Prieto, entitled "Adaptive Filtering for Use with Data Compression and Signal Reconstruction," filed concurrently herewith, and assigned to Motorola, Inc.

TECHNICAL FIELD

This invention relates in general to data compression and particularly to digital data compression. Specifically, the invention relates to a method, and apparatus that provides adaptive filtering in digital data compression system, such as, for example, slow rate video processing and other data compression applications.

BACKGROUND

With the advent of technologies and services related to teleconferencing and digital image storage, considerable progress has been made in the field of image processing. As will be appreciated by those skilled in the art, image processing typically relates to systems, devices, and methodologies for generating image signal data, compressing the image signal data for storage and/or transmission, and thereafter reconstructing the original image from the compressed image signal data. Critical to any highly efficient, cost effective image processing system is the methodology used for achieving compression.

As is known in the art, image compression refers to the steps performed to map an original image into a bit stream suitable for communication over a channel or storage in a suitable medium. Methodologies capable of minimizing the amount of information necessary to represent and recover an original image are desirable in order to lower computational complexity and cost. In addition to cost, methodologies capable of providing high quality image reproduction with minimal delay are likewise desirable.

Due to the enormous growth potential of businesses relying on these techniques, considerable work and effort has been conducted in this area. Despite these efforts, there still remains a need for an improved image processing method, system, and apparatus that operates to reduce the noise generated during image signal compression (quantization noise), improve the achievable signal to noise ratio (quality) during image reconstruction, while avoiding the lengthy delays typically associated with prior art approaches.

DETAILED DESCRIPTION OF THE PREFERRED EMBODIMENT

Figure 1:
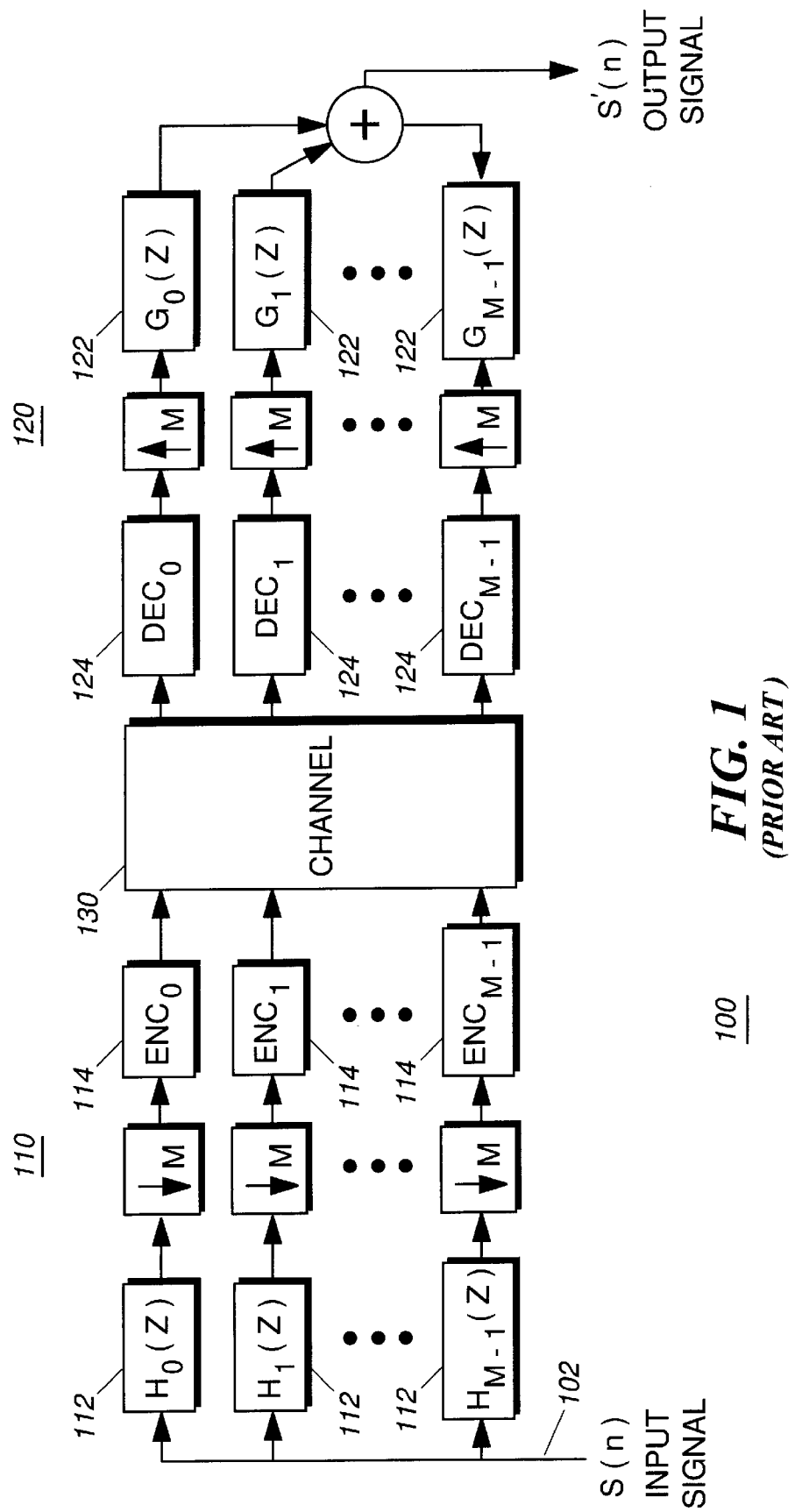
FIG. 1 is a partial block diagram of an image processing system known in the art.

While the specification concludes with claims defining the features of the invention that are regarded as novel, it is believed that the invention will be better understood from a consideration of the following description in conjunction with the drawing figures, in which like reference numerals are carried forward. For the sake of clarity, the present discussion relates to a data processing system, method, and apparatus that employs an encoder optimized to decorrelate and make independent from an original signal, the quantization noise produced during signal compression. The proposed methodology supports high degrees of signal compression, which in turn leads to lower computational complexity and improved performance (i.e., reduced delay). Because the quantization noise produced during signal compression is made non-linearly independent from and orthogonal (i.e., uncorrelated) to the original signal, enhanced filtering techniques are required, which in turn will lead to improved signal-to-noise ratios (SNR) when compared to the known art. The present invention, therefore, is a method and apparatus for filtering data signals to remove independent and uncorrelated noise generated during data compression.

Referring now to FIG. 1, a partial block diagram of a known data communications system 100 is shown. As will be appreciated, the communication system 100 depicts an encoder 110 coupled to a decoder 120 across a channel 130. Both the encoder 110 and the decoder 120 employ compression. As is known, compression attempts to map an original signal into a bit stream suitable for communication over the channel 130. The communications channel 130 may include a wireless, wireline, acoustic, or optically linked transmission path such as, for example, a radio frequency (RF) or fiber optic transmission path. The channel 130 may likewise be a storage medium such as those now known or later developed. Central to all systems of compression is the desire to reduce the number of bits required to represent and subsequently reproduce an original signal.

Since the communication system 100 of FIG. 1 is well known, minimal explanation will be provided at this time. The interested reader may nevertheless refer to P. C. Cosman, R. M. Gray, and M. Viterlli, "Vector quantization of image subbands: A survey," IEEE Transactions on Image Processing, vol. 5, no. 8, pp. 202–225, February 1996, for a more detailed discussion. Suffice it to say, however, the input 102 to system 100 is usually a sampled analog signal. When the input 102 represents an image signal, the samples s(n) e.g., pixels, typically have a resolution of 8–12 bits per sample. The encoder 110 operates to reduce the number of bits per sample required to represent the sampled signal and meet the channel capacity requirements.

In operation, encoder 110 employs a decomposition encoder, such as, for example, a frequency domain encoder. Such an encoder, having M parallel subband filters 112 covering the complete frequency bandwidth of the input signal 102, will encode each frequency band with a coder and at a bit rate matched to the statistics and relative perceptual importance of the particular frequency band in question. As will be appreciated by those skilled in the art, frequency domain encoding techniques offer the advantage that the number of bits used to encode each band can be variable, such that bands with little or no energy may not require encoding, resulting in improved compression. This methodology is frequently referred to as subband encoding.

Each subband filter 112 output is subsequently quantized (compressed) and coded by encoder 114 at a bit rate selected to reduce the number of bits required to represent each sample. There are several algorithms that may be used to achieve compression of an original signal. The most elementary methods quantize each signal sample into one of a small number of levels, each one thereafter being represented by a channel symbol from a global code book. As will be appreciated, a channel symbol need be nothing more than an index or pointer into the location of centroids within a code book. A well-known quantizer is the Lloyd-Max optimal quantizer using nearest neighbor, minimum squared error (MSE) rules to classify an input into a specified number of levels. Assuming the original signal is an image signal, the typical bit rate of an image with acceptable quality when compressed in this way is about 0.4 bits/pixel.

At the receiving end, decoder 120 will reconstruct the original signal. In accordance, decoder 120 has its own code book 124, identical to the code book of encoder 110. Assuming the encoder index is communicated across the channel 140, the decoder 120 can retrieve respective channel symbols and/or code-vectors by merely indexing the code book 124 lookup with a received index. Thereafter, a synthesis filter bank made up of filters 122 receives upsampled-by-M or interpolated subband signals in order to reconstruction the original image samples s'(n). In the absence of quantization, the filters 112 and 122 are interdependent and designed in such a way as to permit perfect reconstruction of the original image 102.

Again, a fundamental advantage of subband coding for data compression is that it transforms the signal into a domain which typically provides unequal energy patterns at the different subbands. This pattern may therefore be exploited to select the optimum coding algorithm which controls the bit allocation among the subbands, according to its energy or perceptual importance. In accordance, subbands with little energy may not be coded at all, resulting in immediate compression. Another advantage is that quantization noise in a particular subband is limited largely to the band of interest, and will not therefore spill over to the other bands.

Figure 2:
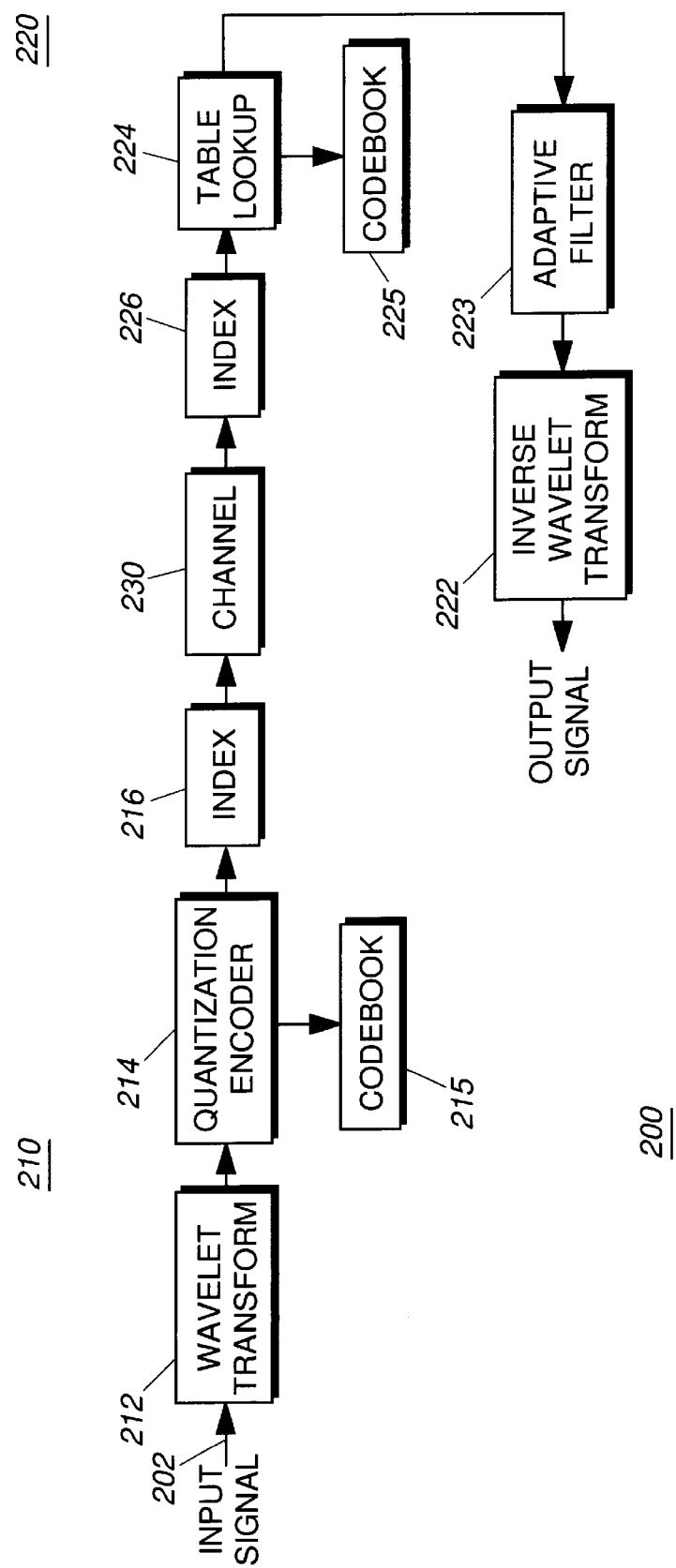
FIG. 2 is a block diagram of the image processing system of the present invention

FIG. 2 is a partial block diagram of a data communications system anticipated by the present invention. In accordance with the preferred embodiment, the communication system 200 of FIG. 2 is an image processing system. As depicted, the decomposition encoder 212 is a multilevel wavelet transform stage that receives the input signal 202, a sampled image signal wherein each pixel has an 8–12 bit/sample resolution. The wavelet transform stage 212 produces a output comprising subband selected vector coefficients of the image signal, as discussed further in association with FIG. 3. Referring back to FIG. 2, wavelet transform stage 212 is coupled to a quantization encoder 214 to communicate the wavelet transformed version of the sampled input signals to the quantizer encoder 214 for further compression.

As will be appreciated by those skilled in the art, after further review hereof, quantization encoder 214 employs first and second quantization stages in order to compress the wavelet transformed signal received from wavelet transform stage 212. As will be discussed in detail in association with FIG. 4, the first quantization stage compresses the wavelet transformed signal and produces compression/quantization noise components, correlated to an non-linearly dependent upon the input signal 202. The second quantization stage compresses an error signal difference between the wavelet transformed signal and an estimate of the quantization noise components to produce noise components independent from the image signal. The purpose of isolating such noise components; namely, those independent from the image signal, is to pursue aggressive filtering techniques that improve reconstructed signal quality, without negatively impacting the desired image signal components. This is especially important when short vector lengths and small code books are employed during image reconstruction.

The quantizer 214 output will be represented by channel symbols or centroids maintained in code book 215. In accordance with the preferred embodiment, each centroid contained within code book 215 is assigned a binary index 216. The index is what is communicated over or stored to channel 230. As previously discussed, the channel 230 may include a wireless, wireline, acoustic, or optically linked path such as, for example, a radio frequency (RF) or fiber optic transmission path. The channel 230 may likewise be a storage medium such as those now known or later developed.

At the receiving end, decoder 220 employs a code book 225 and table lookup 224 to retrieve previously stored (i.e., trained) centroid information by indexing the table lookup 224 with received index information 216 to retrieve information stored in code book 225. As will be appreciated by those skilled in the art, the system 200 is most efficient when code book 225 content is identical to the code book 215 content. Under the circumstance where a single device will transmit and receive information utilizing system 200, the device code book is trained by quantization those images of interests. Upon completion, a single code book for use during transmission and reception of data is available.

The indexed output of table lookup 234 is communicated to an adaptive filter 223 which filters the code book output to remove unwanted noise. Thereafter, an inverse wavelet transform stage 222 operates upon the filtered signal to reconstruct the original signal samples s'(n). While the preferred embodiment suggests filtering the table lookup 224 output, it will be appreciated by those skilled in the art, after review hereof, that adaptive filtering, as described herein in greater detail in association with FIG. 11, may alternatively be performed after the inverse wavelet transformation stage 222 or after the quantization stage 214 without departing from the spirit of the present invention.

While the suggested decomposition encoder 212 is a wavelet transform stage, it will be appreciated by those skilled in the art that other frequency domain encoders now know or later developed may be substituted therefore to achieve acceptable performance. Well known frequency domain encoding techniques include, but are not limited to, fast Fourier transform (FFT), discrete cosine transform (DCT), discrete sine transform (DST), discrete Karhunen-Loeve transform (KLT), discrete Walsh-Hadamard transform (WHT), wavelet transforms (WT), and combinations thereof.

Figure 3:
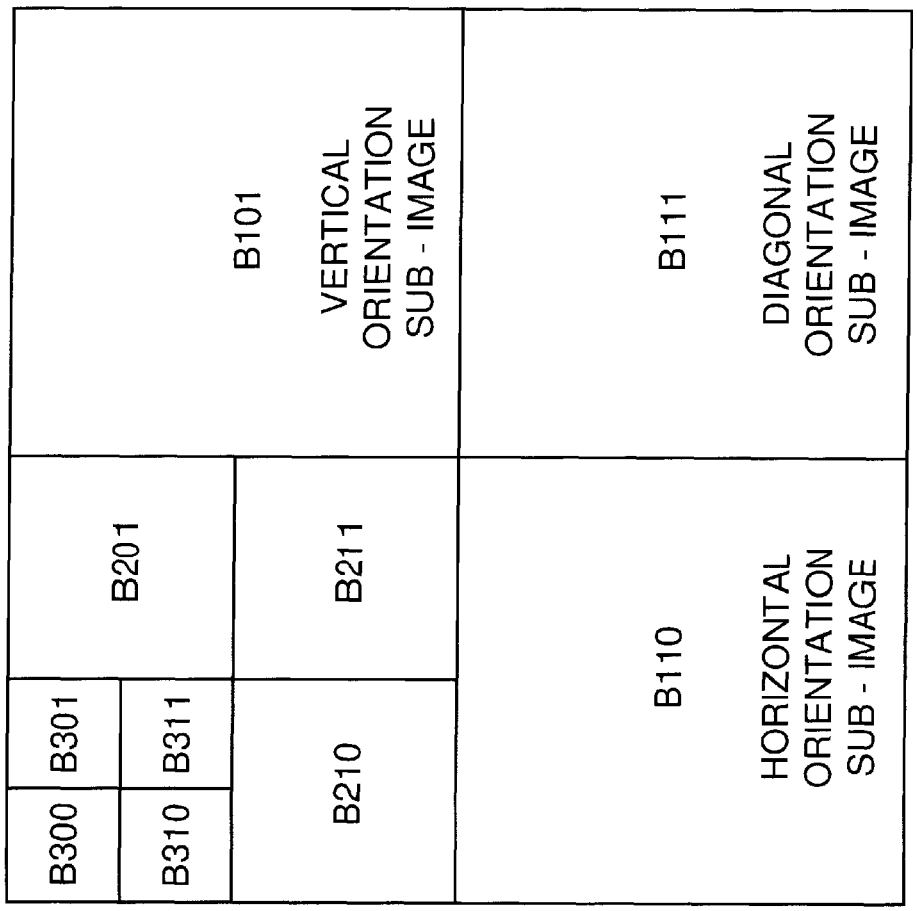
FIG. 3 is a graphical representation of the application of an image signal to the wavelet transform of FIG. 2.
Figure 4:
FIG. 4 is a pictorial representation of an original image.

Prior to vector quantizing the wavelet transformed version of the sampled input signal, the signal must be arranged in vector form as depicted in FIG. 3. Starting with the subbands for the three level wavelet transform, the process is described as follows. Assume the original image as shown in FIG. 4 is 256 by 256 pixels. The subbands associated therewith shall be labeled BX00, BX01, BX10 and BX11, where X=1, 2, or 3. With reference to FIG. 3 it will be appreciated that band B100 is decomposed into four bands B200, B201, B210, and B211. Band B200 is further decomposed into four bands, bands B300, B301, B310, and B311. From the corresponding each level of bands can be blocked into corresponding square blocks such that there is an equal number of blocks for each level of bands. This makes the block size reduce geometrically by ½ from the previous level, until the last band is blocked in pixels of 1 by 1 pixel size.

Figure 5:
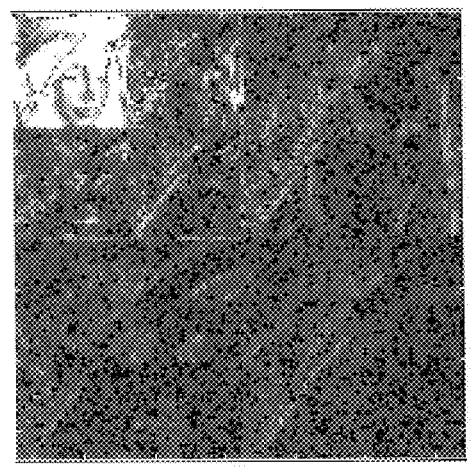
FIG. 5 is a pictorial representation of the application of the image of FIG. 4 to the wavelet transform of FIG. 2.

For a level L wavelet transform, there are 3L+1 subbands. In accordance with the present example, there are therefore 10 subbands. In the current example where the original image of FIG. 4 is 256 by 256 pixels, band B1 is 128 by 128 pixels, band B2 is of 64 by 64 pixels, while band B3 is 32 by 32 pixels. For L=3, the respective block sizes per band are 4×4, 2×2, and 1×1 respectively. This structure is more clearly observed with reference to FIG. 5, which is a pictorial representation of the output of the wavelet transform upon receipt of the original image of FIG. 4. While the present embodiment is a 3 level wavelet transform, it will be appreciated by those skilled in the art that a number of levels less than 3 or greater than 3 can be employed by such a wavelet transform stage.

Figure 6:
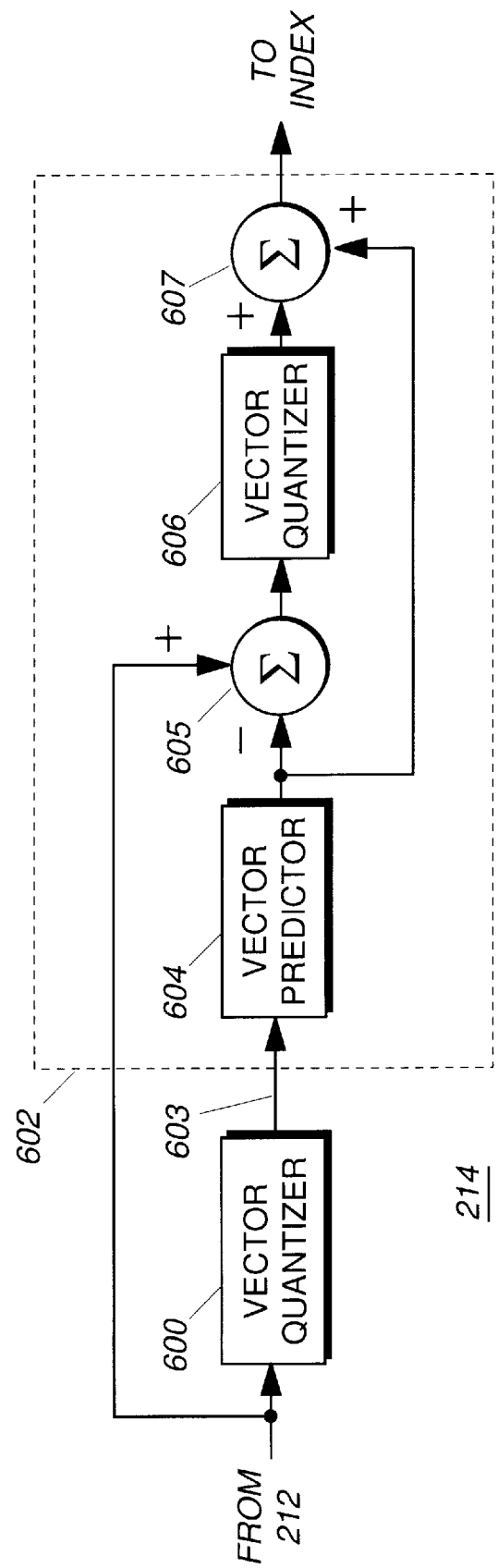
FIG. 6 is detailed block diagram of a first embodiment of the quantizer circuit of FIG. 2.

FIG. 6 is detailed block diagram of one embodiment of the quantizer circuit 214 of FIG. 2. As will be appreciated, the quantizer circuit of the present invention comprises a first vector quantization compressor 600, coupled to the wavelet transform 212 of FIG. 2, for quantizing i.e., compressing the data components received from the wavelet transform 212. In accordance with the preferred embodiment, the first quantization compressor 600 adaptively sizes groups of image vectors presented by the wavelet transform 212 and quantizes the image vectors within each group to establish a centroid for each group. The output from the first vector quantization compressor 600 is a signal comprised in part of quantization noise components correlated to and dependent upon the image signal and compressed vector coefficients. It will be appreciated by those skilled in the art that since the wavelet transform 212 of FIG. 2 performs subband transformation on some, but not necessarily all of the subbands of the input signal 202, quantization compressor 600 likewise performs subband compression on some but not necessarily all input signal subbands. In fact, the system of the present invention is advantageously optimized to operate on subbands according to their energy level or perceptual importance to the original data or image 400 of FIG. 4.

As previously mentioned, the first and second quantization compressors 600 and 606 are Lloyd-Max quantizers. Notwithstanding, the preferred embodiment, other quantization compressors may be substituted therefore; namely, vector quantizers, scalar quantizers, trellis quantizers, and mean-squared-error quantizers, just to name a few.

Continuing, a predictor circuit 602 is coupled to the quantizer 600 output 603. The predictor 602 operates to estimate, predict, or determine the quantization noise as generated by the first quantization compressor 600. This output 603, approximates the noise generated by the quantization compressor 600. Because it is an estimate, as determined by vector predictor 604, it will not typically share a phase relationship or correlation to the input signal 202 of FIG. 2, and may therefore be used as the uncorrelated noise component of the quantizer 600. In effect, predictor 602 operates to decorrelate the noise generated by quantizer 600 from the input signal 202 of FIG. 2.

Figure 8:
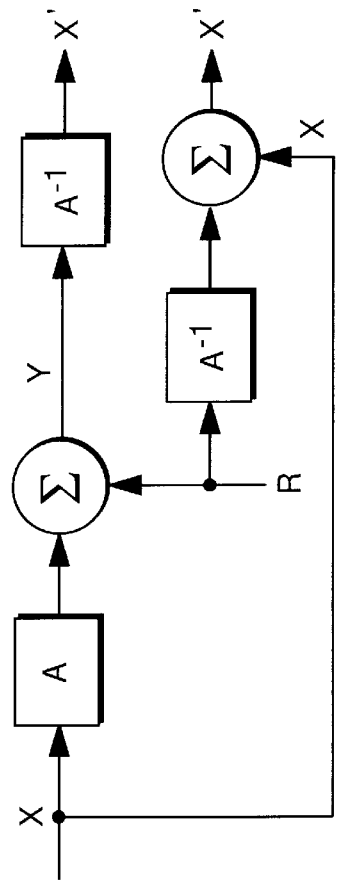
FIG. 8 is a functional block diagram of the predictor circuit as taught in accordance with FIGS. 6 and 7.

For a detailed block diagram of vector predictor 604, the interested reader may refer to FIG. 8. Vector predictor 604 employs a gain-plus-additive-noise model which operates as follows:

$$Y=Q[x]=X+E=AX+R \qquad 1)$$

where X is the data signal, Y is the quantized data signal, E is correlated quantized noise, R is uncorrelated quantized noise, and A is a prediction matrix.

The optimal value of the predictor matrix is:

$$A=(YX^t)(XX^t)^{-1} \qquad 2)$$

To recover X multiply by the inverse of A:

$$A^{-1}Y=X+A^{-1}R=X+N \qquad 3)$$

where N is uncorrelated with X, albeit non-linearly dependent on the input signal.

The error is determined as:

$$E+(A-I)X+AN=(A-I)X+R \qquad 4)$$

Referring back to FIG. 6 the vector predictor 604 output; namely, the uncorrelated quantization noise components, are summed at summing junction 605 with the transformed output of the transform 212 of FIG. 2 to produce an error signal. Likewise, when the input signal is an image, it will be appreciate by those skilled in the art that the estimate signal generated by vector predictor 604 when summed with the plurality of image vector coefficients provided by the wavelet transform 212 of FIG. 2 will combine to generate an error signal. A second Lloyd-Max quantization compression stage 606 is coupled to the summing junction 605 for quantizing the error signal as generated by the summer 605 to generate a quantized error signal. Thereafter, the summing circuit 607 operates to sum the quantized error signal and the estimated signal to generate an output comprised in part of signal independent noise components that are uncorrelated to the input signal and code book content; namely centroids.

In accordance with the present invention, each centered as determined during data encoding is assigned a binary index. This index is typically what is communicated from the encoder 210 to the decoder 220 of FIG. 2. Because the decoder 220 has a code book 225 typically identical to the code book 215 employed by the encoder 210, the centroid values can be retrieved by means of indexing lookup table 224 via the received binary index. As will be appreciated by those skilled in the art, it is more economical and less complex to communicate an index 216 as opposed to actual centroid coefficients.

One of the more critical steps in vector quantization is the design of the code book, such that the operation of the decoder 220 is completely described once the code book is specified. Typically, the set of quantizer outputs describe the code book and the process of placing these outputs is referred to as code book design. In accordance with the preferred embodiment, code book design employs the Linde, Buzo, and Gray algorithm, commonly referred to as the LBG algorithm. For additional details, the interested reader is referred to Y. Linde, A. Buzo, and R. M. Gray, "An algorithm for vector quantizer design" IEEE Trans. Comm., vol. COMM-28, pp. 84–95, 1980.

Figure 7:
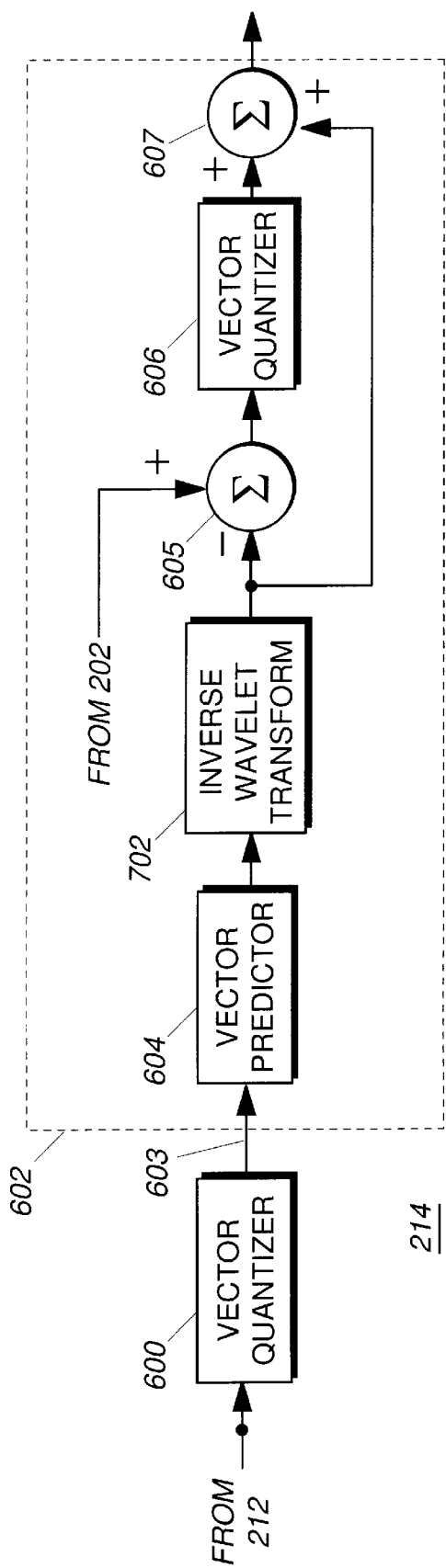
FIG. 7 is detailed block diagram of a second embodiment of the quantizer circuit of FIG. 2.

FIG. 7 is a detailed block diagram of a second embodiment of the quantizer circuit 214 of FIG. 2. As will be appreciated after literal comparison, the circuits are virtually identical. Due to the close similarity, only the differences will be discussed at this time. With reference to FIG. 7, an inverse wavelet transform stage 702 is employed at the output of vector predictor 604. The inverse wavelet transform stage 702 operates to convert the vector predictor error estimate into an estimate image signal. Thereafter, the estimate image signal is summed at summing junction 605 with image signal 202 to produce an image error signal. The second Lloyd-Max quantization compression stage 606 is coupled to the summing junction 605 for quantizing the image error signal as generated by the summer 605 to generate a quantized image error signal. Thereafter, the summing circuit 607 operates to sum the quantized image error signal and the estimated image signal to generate an output comprised in part of signal independent noise components that are uncorrelated to the input signal. Upon closer inspection it will be appreciated by those skilled in the art that the primary differences between the teachings of FIGS. 6 and 7 are that FIG. 6 operates at the subband image level while FIG. 7 operates at the image level.

Figure 9:
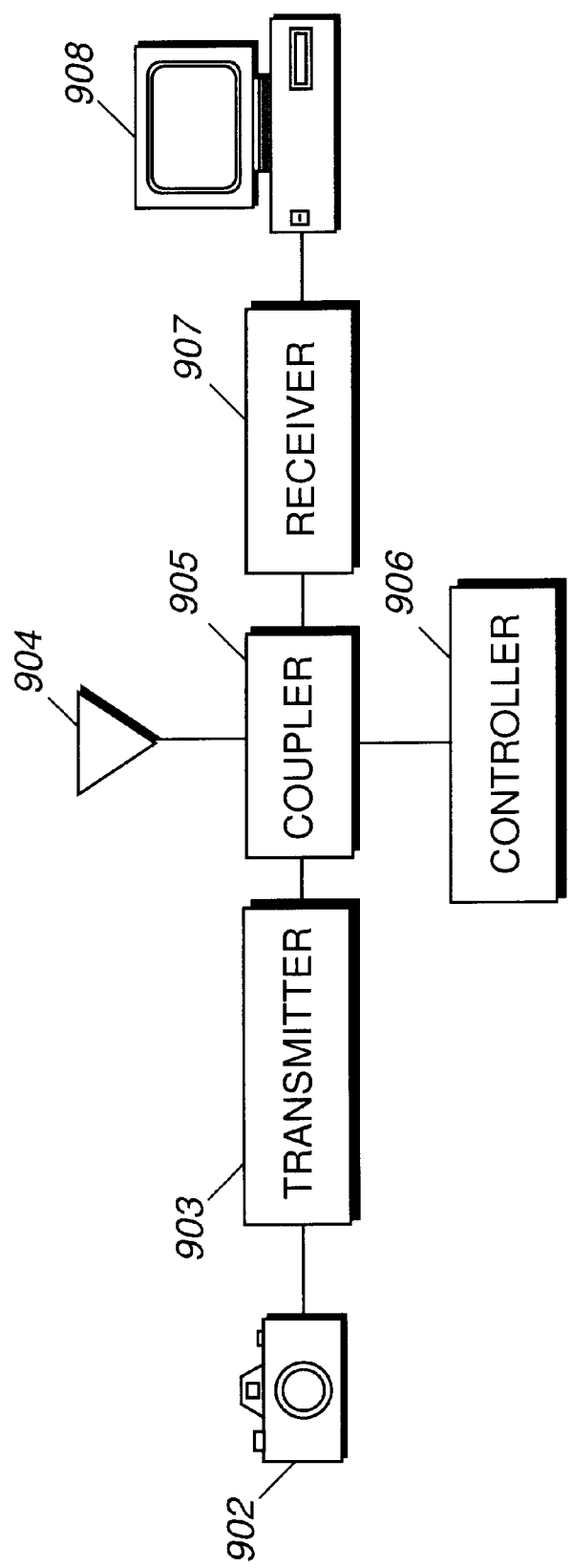
FIG. 9 is a block diagram of a communications device of the type anticipated for use by the present invention.

With reference to FIG. 9, a block diagram of a communications device 900 of the type anticipated for use by the present invention is depicted. The communications device 900 employs a transmitter 903 which operates to transmit signals received from peripheral device 902. For the purpose of this discussion, let's assume device 903 is a document scanner like those known in the art. A receiver 907 couples received signals to peripheral device 908. For the purpose of this discussion, let's assume device 908 is a display device, such as, for example, a cathode ray tube (CRT), liquid crystal display (CRT), or any other type display device, now know or later developed and capable of presenting graphical, pictorial, or text based messages to a device user 900. The antenna 904 of the present invention is coupled to the transmitter 907 and the receiver 907 through coupler 905. As will be appreciated, coupler 905 provides switched operations between transmitter 903 and receiver 907 under the direction of controller 906.

As will be appreciated by those skilled in the art after review hereof, the encoder 210 of FIG. 2, when used in association with the device 900 of FIG. 9, will typically be used during transmit mode. In a similar fashion, the decoder 220 of FIG. 2, when used in association with the device 900, will typically be used during receipt.

Figure 10:
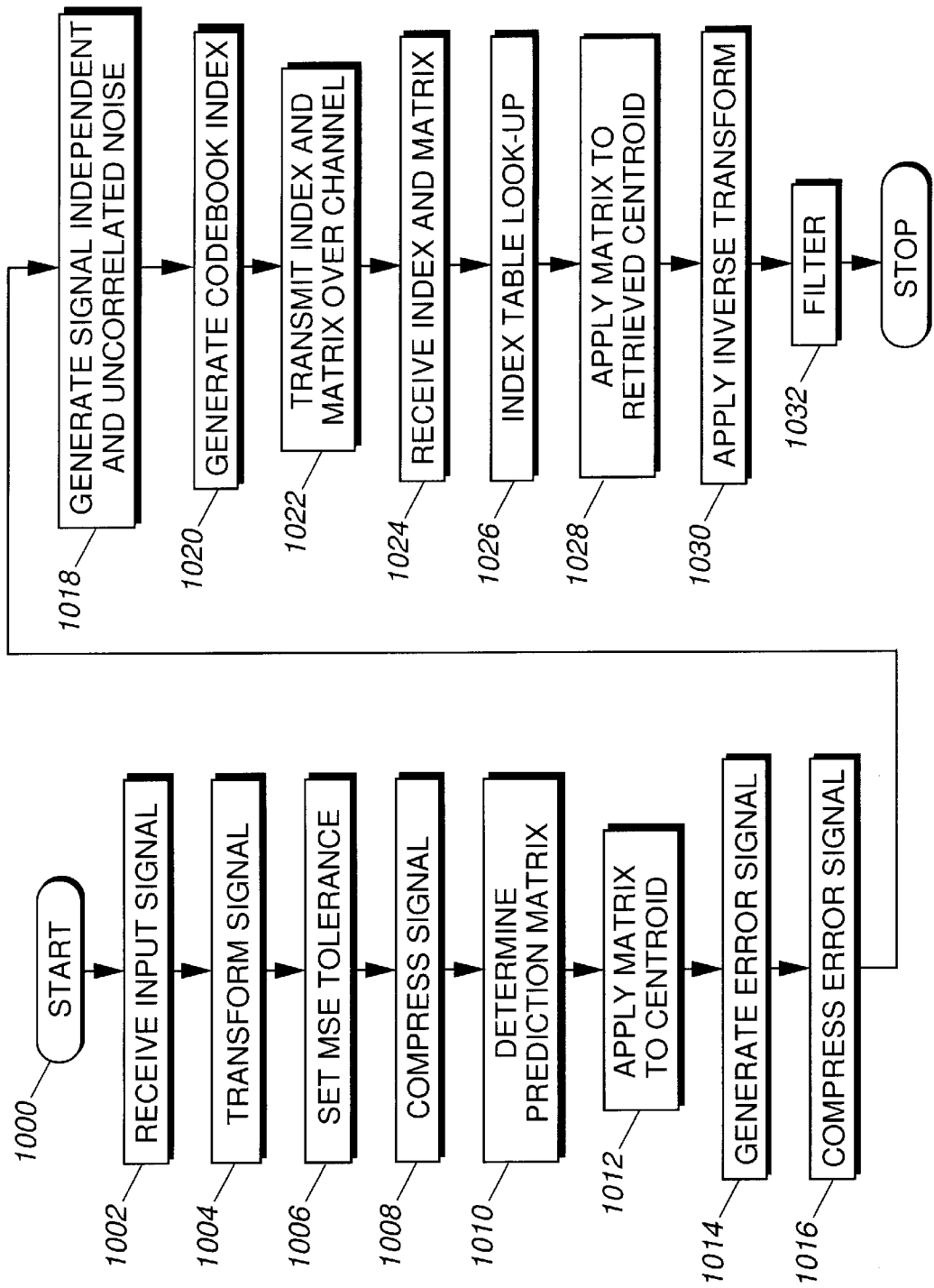
FIG. 10 is a flow chart diagram depicting the steps performed by the device of FIG. 9 employing the compression methodology of the present invention.

FIG. 10 is a flow chart diagram depicting the steps performed by a device 900 of FIG. 9 employing the compression methodology of the present invention. Commencing at start block 1000 flow proceeds to block 1002 where the communications device 900 of FIG. 9 receives a signal, such as an image signal, from a peripheral device 902 in anticipation of transmitting information from transmitter 903. From block 1002, flow proceeds to block 1004 where the information signal is transformed by a transform stage. In accordance with the preferred embodiment of the present invention, this transform stage is a frequency domain transform. In particular, the transform associated with block 1004 is a multilevel wavelet transform which decomposes the input signal into a set of sub-images with different resolutions corresponding to different frequency bands (refer to FIG. 5). The resulting image coefficients are then vector quantized (compressed) at block 1008 using a mean square error (MSE) tolerance as set at block 1006. The MSE tolerance in accordance with the present invention is adaptive (i.e., adjustable) such that the size of the groups of image coefficients around which respective centroids are calculated and across which the mean square error tolerance is exercised may be sized in order to improve image reconstruction time, reduce image reconstruction cost, or enhance image reconstruction quality.

From block 1008 flow proceeds to block 1010 where the vector predictor of 604 of FIG. 6 determines a prediction matrix as a function of the compression noise generated by the quantization compressor 600 of FIG. 6. In accordance with the preferred embodiment, vector predictor 604 utilizes a gain-plus-additive-noise model further described by $Y=X+E=AX+R$, where X is the input signal, Y is the quantized input signal, E is correlated quantized noise, R is uncorrelated quantized noise, and A is a prediction matrix. From block 1010, flow proceeds to block 1012, where the vector predictor 604 applies the prediction matrix to the centroid of each group of vector coefficients to generate an estimate signal. Of importance, the estimate signal as generated by vector predictor 604 has noise components that are uncorrelated and non-linearly dependent upon the input signal. This dependence between the noise components and the input signal renders typical noise rejection techniques ineffective. Notwithstanding, substantial noise rejection improvement could be achieved if the interdependence between the estimate signal and the input signal were removed. To achieve this goal the present invention employs the prediction circuit 602 of FIG. 6 for generating signal independent noise components that are uncorrelated to the input signal.

From block 1012, flow proceeds to block 1014, where the estimate signal and with the plurality of image vector coefficients are summed to generate an error signal. From block 1014 flow proceeds to block 1016 where the error signal is compressed (quantized) by a mean square error (MSE) quantizer 606 of FIG. 6. In accordance with the preferred embodiment, the quantizer 606 is a vector quantizer. In particular, the vector quantizer of choice is a Lloyd-Max quantizer, which, as previously mentioned, compresses the error signal to generate a quantized error signal. At block 1018 the quantized error signal and the estimate signal are summed to generate signal independent noise components that are uncorrelated to the input signal, such that filtering becomes an viable noise rejection mechanism. As will be appreciated by those skilled in the art after review hereof, filtering may be employed at either the encoder 210 output, the decoder 220 output, or any point of advantage thereinbetween.

From block 1018, flow proceeds to block 1020 where a code book index 216 of FIG. 2 is created for each of the centroids generated in accordance with block 1008 above. From block 1018, flow proceeds to block 1022 where the transmitter 902 of FIG. 9 transmits the index 216 and predictor matrix over the channel 230 of FIG. 2.

At block 1024, a communications device, such as the device 900 of FIG. 9, receives the transmitted index and predictor matrix information. At block 1026, the device indexes the code book 225 of FIG. 2 with the received index information to retrieve predetermined centroid coefficients stored to the code book. At block 1028 the predictor matrix is applied to the retrieved predetermined centroid coefficients to generate an output comprising modified code book information. At block 1030 the modified code book information is filtered utilizing filter 223 of FIG. 2. As described hereinafter, filter 223 is an adaptive orientation wiener (AOW) filter that operates to remove the signal independent and uncorrelated noise from the retrieved code book value, after application of the matrix.

From block 1030, flow proceeds to block 1032 where the inverse wavelet transform operates on the filtered signal to reconstruct the original signal samples s'(n). While the preferred embodiment suggests filtering the product output of table lookup 224, it will be appreciated by those skilled in the art, after review hereof, that filtering may alternatively be performed after the quantization stage 214 as well as after the inverse wavelet transformation stage 222.

Figure 11:
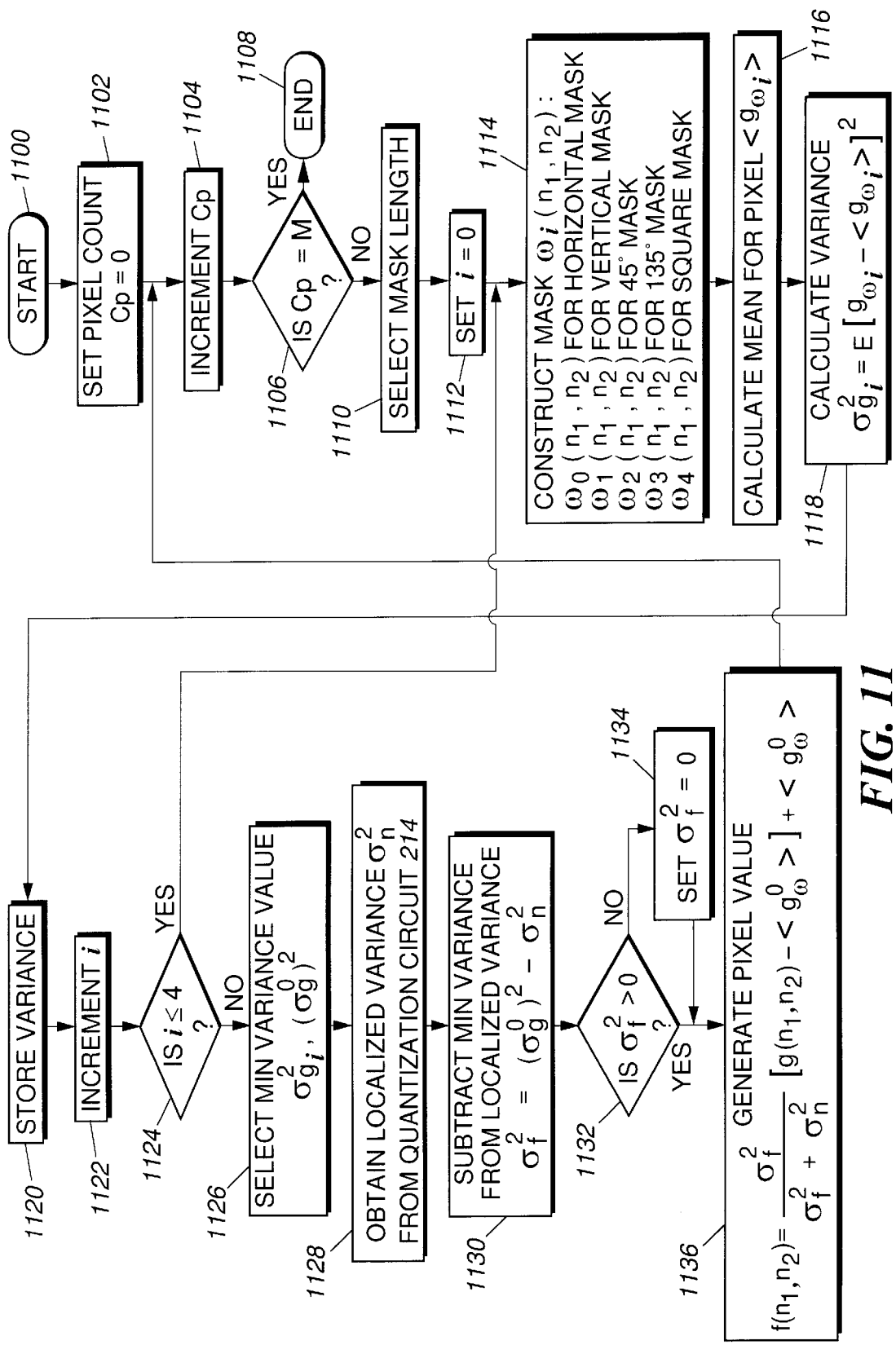
FIG. 11 is a flow chart diagram depicting the steps involved with filtering noise in accordance with the present invention.

FIG. 11 is a flow diagram depicting the steps performed by filter 223 of FIG. 2 as mentioned in association with step 1030 of FIG. 10 to provide filtering in accordance with the present invention. The filter of the present invention is a spatial domain uncorrelated Weiner or adaptive orientation Weiner (AOW). The AOW of the present invention operates to process each pixel of the input image (g $n_1$, $n_2$) develop a set of masks which when applied to the pixel will assist in reducing noise variance and more clearly defining image edges.

In operation, the filtering commences at start block 1100 when a code book output product is received by filter 223 of FIG. 2. As will be appreciated the code book output comprises a plurality of coefficients, each coefficient comprising a signal component and a noise component. The noise component comprises signal independent uncorrelated noise. As will be appreciated from this continuing discussion, the input to filter 223 is typically a subset of the coefficients that comprise the entire image. From block 1100, flow proceeds to block 1102 where a pixel counter $C_p$ is set to zero. At block 1104 the pixel counter $C_p$ is incremented. At block 1106 a check is made to determine whether all image pixels have been processed. If so, flow proceeds to block 1108 where the process flow terminates. Otherwise, flow proceeds from block 1106 to block 1110 where a mask length is selected. The mask length refers to a number of pixels around each pixel and is defined as 2p+1. From block 1110, flow proceeds to block 1112 where the variable i is set to zero, 0. At block 1114, one of a plurality of masks is generated. In accordance with the preferred embodiment, there are five to choose from; namely, the square filter, represented by $(2p+1)^2$ with the pixel at the center ($n_1$, $n_2$), the horizontal filter, with pixels ($n_1$–p: $n_1$+p, $n_2$), the vertical filter, with pixels ($n_1$, $n_2$–p: $n_2$+p), and the 45 degree filter, as well as the 135 degree filter. If we consider the rectangular window g ($n_1$–p: $n_1$+p, $n_2$–p: $n_2$+p) of pixels as a matrix W ($n_1$, $n_2$) of size (2p+1), the filter processes either 1) the entire matrix with the square filter; 2) the central row with the horizontal filter; 3) the central column with the vertical filter; 4) the second main diagonal with the 45 degree filter; or 5) the main diagonal with the 135 degree filter. As will be appreciated by those skilled in the art, the square filter is a low pass filter while the directionally oriented filters are edge detectors filters.

From block 1114, flow proceeds to block 1116 where a mean is calculated for the pixel in question in accordance with $$<{}^g\omega_i>\qquad\qquad(5)$$

From block 1118, flow proceeds to block 1220 where a variance is calculated for the pixel in question in accordance with:

$$\Sigma_i\{({}^g\omega_i-<{}^g\omega_i>)^2\}\qquad\qquad(6)$$

From block 1118 flow proceeds to block 1120 where the variance as calculated at block 1118 is stored. At block 1122 i is incremented. Thereafter, at block 1124, a check is made to determine whether all masks under consideration have been applied. If not, flow branches back to block 1114 where a different mask is selected and the mean and variance are again calculated and stored for the pixel in question as differentiated by a second mask. This process continues until all masks in question have been used to generate means and variance data for the pixel in question.

After all the masks of interest have been applied, flow proceeds from block 1124 to block 1126, where a minimum variance value is selected. Said another way, at block 1126 a filter mask from among the plurality of filter masks is selected. As will be appreciated by those skilled in the art, after review hereof, the filter mask exhibiting a minimum variance output is typically a mask having a directional orientation (e.g., horizontal, vertical, 45 degree, 135 degree) similar to the orientation exhibited by the group of image components being filtered. Thus, in accordance with the preferred embodiment, the filter 223 of FIG. 2 adaptively selects a filter mask from a plurality of available filter masks. Based, in part, upon similar or shared orientations between the mask and a group of image components. Of note, the above process need not require that all available masks be employed. It merely sets forth that some set of masks less than or equal to the set of available masks is satisfactory to perform the task.

From block 1126, flow proceeds to block 1128 where a localized noise variance as determined by the quantization circuit 214 of FIG. 2., passed across the channel 230 of FIG. 2, and stored in memory is retrieved. At block 1130 the localized noise variance is subtracted from the minimum variance to generate an estimated local variance.

At block 1132 a check is performed to determine whether the estimated localized variance is greater than a threshold. If so, flow proceeds to block 1136, otherwise, flow proceeds to block 1134 where the estimated localized variance is set to zero and then flow proceeds to block 1136. At block 1136 a filtered pixel value can be estimated as a function of the estimated localized variance. As the image variance estimate improves over the noise level, the output value more closely resembles the original input. From block 1136 flow branches back to block 1104 where the pixel counter is incremented and the process is repeated. As will be appreciated by those skilled in the art, this process will continue until all pixels of the reconstructed image have been filtered. In accordance, the AOW of the present invention performs image reconstruction and filtering on a pixel-by-pixel basis with a mask length of (2p+1). The center pixel is associated with a specific centroid by the decoder and the value of the estimated noise variance is obtained by quantizer 214 of FIG. 2 and passed across the channel 23C for use during image signal reconstruction and noise filtering as suggested herein.

The advantages of the present invention are several. Suffice it to say, however, the quantization circuit 214 of FIG. 2 permits one to degrade the original image by selecting fewer centroids over which to represent an original image, thereby reducing the size of the code book required to practice image reconstruction. Reduction in code book sizes typically equates to a faster image reconstruction system. Since the present invention elects to deal with the noise associated with compression, a recognizable improvement in signal-to-noise is exhibited by this approach which operates to render noise generated during data compression signal independent and uncorrelated from the input so that it may be filtered without negatively impacting the original input.

Filtering, as taught by the present invention, is directed towards the removal of independent and uncorrelated noise components from the reconstructed signal. In accordance, an adaptive filter selects a filter mask from a plurality of available filter masks. Mask selection is based, in part, upon a similar or shared orientation between the mask and a group of image components/coefficients within the reconstructed signal. Of note, image component processing is performed on a local (e.g., pixel-by-pixel or 2 pixel-by-2 pixel) basis as opposed to a global basis (e.g. across the entire image). Moreover, image component processing may be performed at either the subband signal or image signal level. The advantage over the known art is that the noise correlation does not become correlated with the input as masks are sequentially applied.

Figure 12:
FIG. 12 is a pictorial representation depicting original image reconstruction in accordance with the prior art.
Figure 13:
FIG. 13 is a pictorial representation depicting original image reconstruction in accordance with the present invention.

For the sake of clarity, FIG. 12. is a pictorial representation depicting original image reconstruction in accordance with the prior art. FIG. 13, by contrast, is a pictorial representation depicting original image reconstruction in accordance with the present invention. These two figures are presented so that a visual comparison can be made.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, in accordance with the anticipated operation, the filter 223 of the present invention will likely be implemented in a digital signal processor (DSP), microprocessor, micro-controller, or some other computer logic circuit either currently available or later developed that is capable of performing the procedure of FIG. 11. It will therefore be appreciated by those skilled in the art that filter 223 is achievable as a hardware or firmware embodiment such as the one depicted in FIG. 14.

Figure 14:
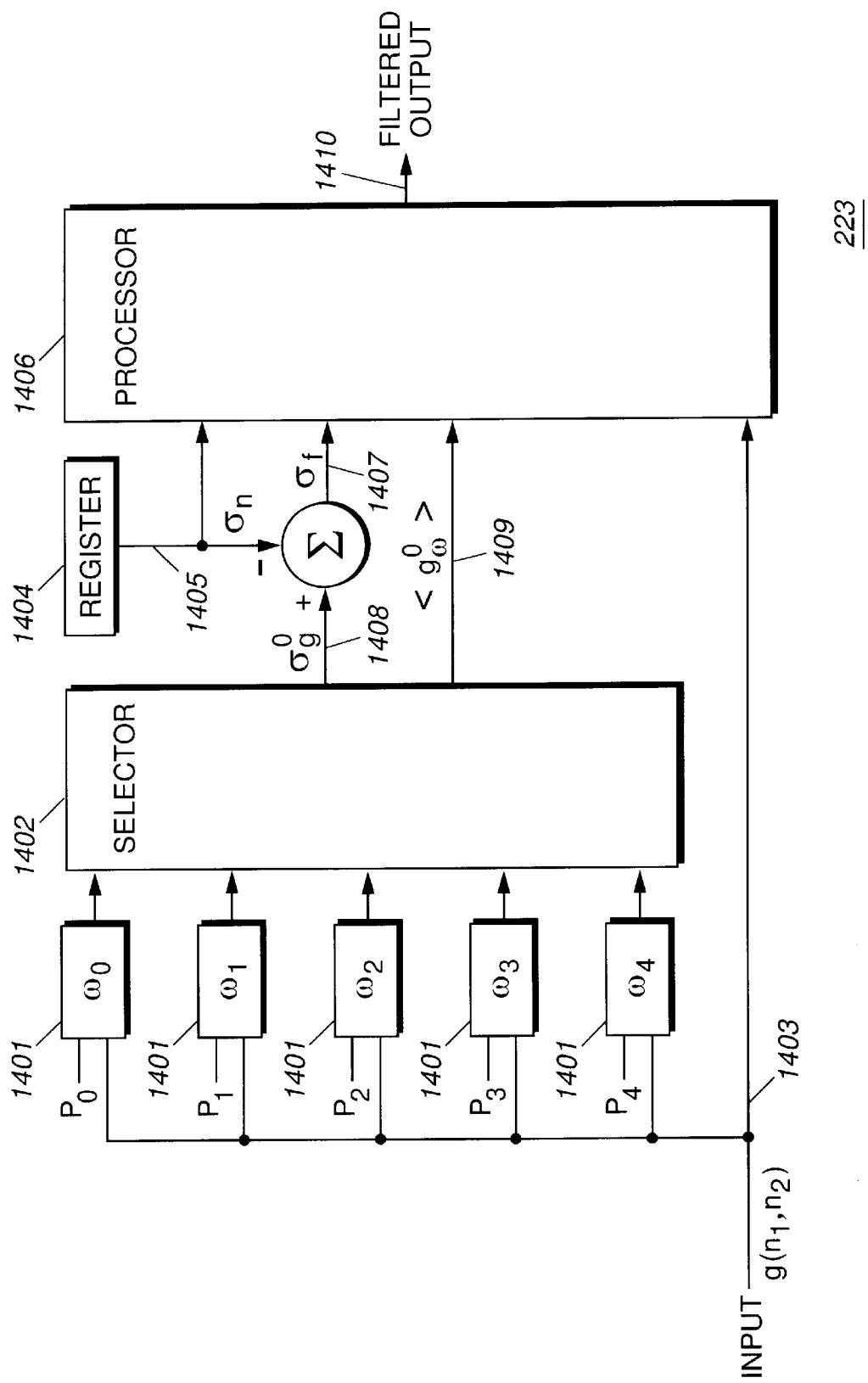
FIG. 14 is a functional block diagram of an embodiment of the filter of the present invention.

With reference to FIG. 14, there is shown a plurality of filter masks 1401, each having a different orientation as described hereinabove. Each filter mask 1401 receives as an input a value P representing the mask length and a group of input signal coefficients $g(n_1,n_2)$, 1403. Selector 1402 operates upon the filter mask outputs to select a filter that provides a minimum variance output. In operation, it will be appreciated that the mask which provides such a minimum variance output will have an orientation which is similar to the orientation exhibited by the input $g(n_1,n_2)$. In accordance, mask selection may be determined as a function of orientation as well as minimum variance.

As depicted, the selector output 1408, which is a minimum variance value, is summed with the localized noise variance value 1405, generated during quantization by the quantizer 214 of FIG. 2 and stored to register 1404, to generate an estimated local variance value 1407. Thereafter, processor 1406 utilizes the appropriate inputs to generate the filtered output 1410 in accordance with block 1136 of FIG. 11.

What is claimed is:

1. A data compression encoder comprising:
 a first quantizer, for receiving an input signal having data and compressing the data to generate compressed data and signal dependent noise;
 a predictor, coupled to the first quantizer, for generating uncorrelated noise components generated by the first quantizer; and a second quantizer, coupled to the predictor, for quantizing a signal indicative of noise generated by the first quantizer, such that the encoder produces signal independent noise components that are uncorrelated to the input signal.

2. The encoder of claim 1 further comprising a filter for filtering the signal independent noise components that are uncorrelated to the input signal.

3. The encoder of claim 1 further comprising a transform stage coupled to the quantizer.

4. The encoder of claim 3 wherein the transform stage is a transform selected from the group consisting of frequency domain transforms, spatial domain transforms, and statistical domain transforms.

5. The encoder of claim 1 wherein the quantizer is a device selected from the group consisting of vector quantizers, scalar quantizers, trellis quantizers, and truncation quantizers.

6. The encoder of claim 1 wherein the predictor is a device selected from the group consisting of gain-plus-additive noise predictor, memory less predictor, high order, predictor, non-linear predictors, and predictors having memory.

7. The encoder of claim 1 wherein the data is selected from the group of information consisting of: speech, audio, video, and still images.

8. A data compression encoder comprising:
 a transform stage for receiving an input signal having data and providing a transformed output in response thereto;
 a first quantizer, coupled to the transform stage, for quantizing the transformed output, to generate compressed data and signal dependent noise; and
 a second quantizer, coupled to the first quantizer, for quantizing a signal indicative of noise generated by the first quantizer,
 such that the encoder produces signal independent noise components that are uncorrelated to the input signal.

9. The encoder of claim 8, wherein the transform stage is selected from the group consisting of frequency domain transforms.

10. The encoder of claim 8, wherein the transform stage does not transform all subbands within the input signal.

11. The encoder of claim 8, wherein the first and second quantizers are means-squared quantizers selected from the group of consisting of:
 vector quantizers
 scalar quantizers; and
 trellis quantizers.

12. The encoder of claim 8, further comprising a predictor, coupled between the first and second quantizers, for estimating noise components that are uncorrelated to the input signal.

13. The encoder of claim 8 further comprising a filter for filtering noise components that are signal independent and uncorrelated to the input signal.

14. A data compression encoder for use in slow rate signal processing comprising:
 a wavelet transform for receiving an input signal and providing a transformed output having vector coefficients;
 a first quantizer, coupled to the wavelet transform, for selecting a group of vector coefficients to form a vector and quantizing the vector to generate compressed data and signal dependent noise;
 a predictor, coupled to the first quantizer, for estimating noise components generated by the first quantizer; and
 a second quantizer, coupled to the predictor and the first quantizer, for quantizing a signal indicative of noise components generated by the first quantizer,
 such that the encoder produces signal independent noise components that are uncorrelated to the input signal.

15. The encoder of claim 14, wherein the first and second quantizer are Lloyd-Max quantizers.

16. The encoder of claim 14, wherein the predictor estimates quantization noise as a function of $Y=X+E=AX+R$, where X is the input signal, Y is the quantized input signal, E is correlated quantized noise, R is uncorrelated quantized noise, and A is a prediction matrix.

17. The encoder of claim 14, wherein the first quantizer sizes groups of image vectors to enhance image reconstruction quality.

18. The encoder of claim 14, wherein the first quantizer sizes groups of image vectors so as to improve image reconstruction time.

19. The encoder of claim 14, wherein the first quantizer sizes groups of image vectors so as to reduce image reconstruction cost.

20. The encoder of claim 14, wherein the first quantizer alters a number of centroids required to represent the input signal by selecting a means-squared error tolerance.

21. The encoder of claim 14, wherein the predictor predicts the noise components being uncorrelated to the image signal as a function of quantization gain plus additive noise.

22. The encoder of claim 14, further comprising a filter to remove signal independent noise components that are uncorrelated to the input signal.

23. A data compression system comprising:
a transmitter;
an image encoder coupled to the transmitter and having:
   a wavelet transform for receiving an image signal and providing a transformed output comprised of image vectors,
   a first vector quantizer, coupled to the wavelet transform, for adaptively sizing groups of image vectors and quantizing the image vectors within each group to establish a centroid for each group and an index for each centroid,
   a predictor, coupled to the first vector quantizer, for determining noise components generated by the first vector quantizer as a function of a prediction matrix, said noise components being uncorrelated to the image signal, and
   a second vector quantizer, coupled to the predictor and the first vector quantizer, for quantizing a signal indicative of noise components generated by the first vector quantizer,
the transmitter communicating index and prediction matrix across a channel; and a receiver;
an image decoder, coupled to the receiver, for receiving the index and the prediction matrix, the image decoder comprising:
   a table lookup for indexing centroid information with the index,
   an inverse wavelet transform, coupled to the table lookup, for reconstructing the image signal; and
   a filter, coupled to the inverse wavelet transform, for filtering signal independent noise components that are uncorrelated to the input signal.

24. The system of claim 23, wherein the wavelet transform improves image signal compression by transforming select image signal subbands.

25. The system of claim 23, wherein the first vector quantizer selects the size of image vector groups to enhance image reconstruction quality, improve image reconstruction speed, and reduce image reconstruction cost.

26. The system of claim 23, wherein the channel is selected from the group media consisting of:
wireless communications channels;
optical communications channels;
wireline communications channels;
radio frequency (RF) communications channels; and
storage media.

27. The system of claim 23 wherein a quantizer obtains a local noise variance generated for each centroid centered.

28. The system of claim 27 wherein the transmitter communicates local noise variances across the channel.

29. A data compression method comprising the steps of:
compressing an input signal having data to generate compressed data and signal depended noise; and
processing the signal dependent noise to generate signal independent noise components that are uncorrelated to the input signal;
wherein the step of processing the signal dependent noise comprises the steps of:
   applying estimated noise component to the compressed data to generate a signal comprised in part of noise components that are uncorrelated to and dependent upon the input signal;
   summing the signal comprised in part of noise components that are uncorrelated to and dependent upon the input image signal and the compressed version of the input signal to generate an error signal;
   compressing the error signal to generate signal independent noise components; and
   summing the signal comprised in part of noise components that are uncorrelated to and dependent upon the image signal with the signal independent noise components.

30. A method for compressing an image signal comprising the steps of:
receiving the image signal;
transforming selective subbands of the image signal into a signal comprising a plurality of image coefficients;
adaptively sizing groups of coefficients to form image vectors;
compressing the image vectors within each group with a vector quantization compressor to establish a centroid for each group;
estimating a compression noise as generated by the vector quantization compressor;
applying the compression noise estimate to the centroid for each group to generate an estimate signal comprised in part of noise components, uncorrelated to and dependent upon the image signal and estimated code vector coefficients;
summing the estimate signal and the plurality of image vectors to generate an error signal;
quantizing the error signal to generate a quantized error signal;
summing the quantized error signal and the estimate signal to generate an output comprised in part of signal independent noise components that are uncorrelated to the input signal; and
filtering the signal independent noise components.

31. The method of claim 30, wherein the step of transforming selective subbands of the image signal further comprises the step of:
selecting image signal subbands as a function of an original image; and
wavelet transforming the selected image signal subbands.

32. The method of claim 30, wherein the step of transforming selective subbands of the image signal further comprises the step of:

omitting image signal subbands as a function of the original image; and wavelet transforming the selected image signal subbands.

33. The method of claim 30, wherein the step of transforming selective subbands of the image signal further comprises the step of:

selecting low frequency image signal subbands for quantization.

34. The method of claim 30, wherein the step of adaptively sizing groups of image coefficients further comprises the steps of:

selecting a small group of image vector to enhance image reconstruction quality; and selecting a large group of image vectors to improve image reconstruction speed.

35. The method of claim 30, wherein the step of adaptively sizing groups of image coefficients further comprises the step of:

adjusting the size of a group of image vectors to enhance image reconstruction quality, improve image reconstruction speed, and reduce image reconstruction cost.

36. The method of claim 30, wherein the step of compressing the image vector within each group further comprises the step of:

selecting a code vector within a group; and performing a mean-squared-error calculation between the selected code vector and all other image vectors within the group to establish the centroid for the group.

37. The method of claim 30, wherein the step of estimating the compression noise further comprises the step of determining a predictor matrix.

38. A method for compressing an image signal comprising the steps of:

receiving the image signal and providing a transformed output thereof comprising a plurality of image coefficients;

adaptively sizing groups of image coefficients to form vectors and compressing vectors within each group to establish a centroid for each group;

determining a prediction matrix as a function of compression noise;

applying the prediction matrix to the centroid for each group to generate an estimate signal, summing the estimate signal with the transformed output to generate an error signal;

compressing the error signal to generate a quantized error signal;

summing the quantized error signal and the estimate signal to generate signal independent noise components that are uncorrelated to the input signal, and modified centroid;

generating a code index;

communicating the code index and the predictor matrix across a channel;

receiving the code index and the predictor matrix from the channel;

indexing a lookup table via the code index to access a predetermined centroid;

applying the predictor matrix to the predetermined centroid coefficients to generate an output;

applying an inverse transform to the output to reconstruct the image signal; and adaptively filtering the image to generate a reconstructed image.

39. The method of claim 38 further comprising the step of adaptively filtering the signal independent noise components that are uncorrelated to the input signal.

* * * * *